United States Patent [19]

Magrath et al.

[11] Patent Number: 4,696,258
[45] Date of Patent: Sep. 29, 1987

[54] METHOD AND SUBSTANCE FOR THE DETECTION OF COWS IN ESTRUS

[75] Inventors: Joseph M. Magrath, McCook, Nebr.; Thomas R. Tice, Birmingham, Ala.; William E. Meyers, Helena, Ala.; Thomas O. Dappert, Birmingham, Ala.

[73] Assignee: The Magrath Company, McCook, Nebr.

[21] Appl. No.: 821,219

[22] Filed: Jan. 21, 1986

Related U.S. Application Data

[63] Continuation-in-part of Ser. No. 595,625, Apr. 4, 1984, abandoned.

[51] Int. Cl.⁴ .............................................. A01K 29/00
[52] U.S. Cl. ........................................................ 119/1
[58] Field of Search .......................... 119/1; 428/402.2

[56] References Cited

U.S. PATENT DOCUMENTS

| | | | |
|---|---|---|---|
| 3,076,431 | 2/1963 | Rule et al. | 119/1 |
| 3,158,133 | 11/1964 | Larson | 119/1 |
| 3,469,439 | 9/1969 | Roberts et al. | 428/402.2 |
| 3,942,475 | 3/1976 | Wassilieff et al. | 119/1 |
| 4,307,169 | 12/1981 | Matkan | 428/402.2 |

*Primary Examiner*—Robert P. Swiatek
*Attorney, Agent, or Firm*—Wm. Griffith Edwards

[57] ABSTRACT

A substance for facilitating the detection of estrus applied to the tailhead and rump of a cow as a patch comprises a mass of microencapsulated dye mixed in a suitable paint. The paint dries as a durable layer the color of which will change when substantial pressure is applied for a predetermined time. Should the cow be mounted by another animal for say five seconds or more a large portion of the microcapsules will break and release the dye which colors the patch. The cows with colored patches can then be found by periodic inspection and removed from the herd for insemination.

17 Claims, 3 Drawing Figures

METHOD AND SUBSTANCE FOR THE DETECTION OF COWS IN ESTRUS

This application is a continuation-in-part, of application Ser. No. 06/596,625, filed Apr. 4, 1984, and now abandoned.

This invention relates to the breeding and raising of cattle and other domestic animals and particularly to a new method for identifying in a herd of cows any cows that are in heat or estrus.

BACKGROUND AND PRIOR ART

For the most effective handling of a herd of cows during the breeding season it is important that cows in estrus be identified promptly and separated from the herd for either natural or artificial insemination, a cow being fertile for only about twelve hours during a twenty-one day period of estrus.

It is well known that cows in a herd when they are in heat will permit another animal to mount them for an appreciable time but other wise will reject the mount immediately. The indentification of cows in heat has been accomplished traditionally by observation, the cows seen to allow mounting by other cows being separated from the herd. This required continuous observation of the herd during the breeding season in order to separate the cows in heat as promptly as possible. The heat detectors as presently employed provide a visible indication such that any cows which have been mounted for a predetermined length of time, say five seconds, can be identified without observation of the act of mounting. Thus detection may be accomplished by periodic inspection of the herd rather than by continuous observation.

Various methods and devices have been employed for the purpose of determining which cows are in heat. An effective estrus detecting device in general use today is that disclosed in U.S. Pat. No. 3,076,431 issued to Wilbur E. Rule and Carl D. Smith on Feb. 5, 1963. This device comprises a small fabric patch which may be cemented to the rump of the cow. The patch contains a small tube containing colored fluid, the fluid of which is released to the patch when the tube is under sufficient pressure for a predetermined time. The cow which has been mounted for a preselected length of time can then be detected by the color appearing on the patch.

Various paint-like substances have also been tried for use in heat detection, these substances being applied to the rump of the cow. The substantial rubbing off or spreading of the paint is then relied on as an indication of mounting.

It is an object of the present invention to provide an improved estrus detecting substance which may be applied to cows in the manner of paint or will be other wise spreadable and will provide a positive and easily observed indication of mounting by another animal.

It is another object of theis invention to provide an improved method and substance for detecting estrus in cows which will provide a readily observed change in color of a patch of the substance resulting from the mounting of a cow on which the substance has been applied.

It is a further object of this invention to provide an easily applied and inexpensive substance which may be employed effectively for the detection of estrus in cows.

Further objects and advantages of this invention will become apparent as the following description proceeds.

BRIEF SUMMARY OF THE INVENTION

A paint or coating substance is prepared which when applied to the hide of an animal will adhere for a substantial period of time and will not readily wash off. The substance is pressure sensitive and when sufficient pressure is applied will undergo a change of color. The substance has a mass of microencapsulated color or dye matter mixed therein; the microcapsules may comprise a liquid dye, or a solution of a dye or a dispersion of dye coated with or enclosed in a wall material such as a gelatin. When sufficient pressure is applied to a later of the substance for a substantial time the microcapsules break in large numbers and release the dye which colors the later of the substance and serves as a readily visible indictor that pressure has been applied. The characteristics of the subsstance and particularly the material of the capsule walls and the dye are selected to be reliably and consistently effective in producing the required color indication upon application of pressure equal to that existing between the rump or tailhead of a cow and the sternum of a mounting bull or cow which is maintained for a period of time greater than the time of a rejected mounting. The initial color of the substance is selected to provide a contrast with the color of the animal's hair so that the marked animals can be easily detected from a distance and so that the change in color also will be obvious. The color released by the crushing of the capsules is selected to remain clear and distinctly visible for at least twenty-four hours.

DETAILED DESCRIPTION

Figure 1:
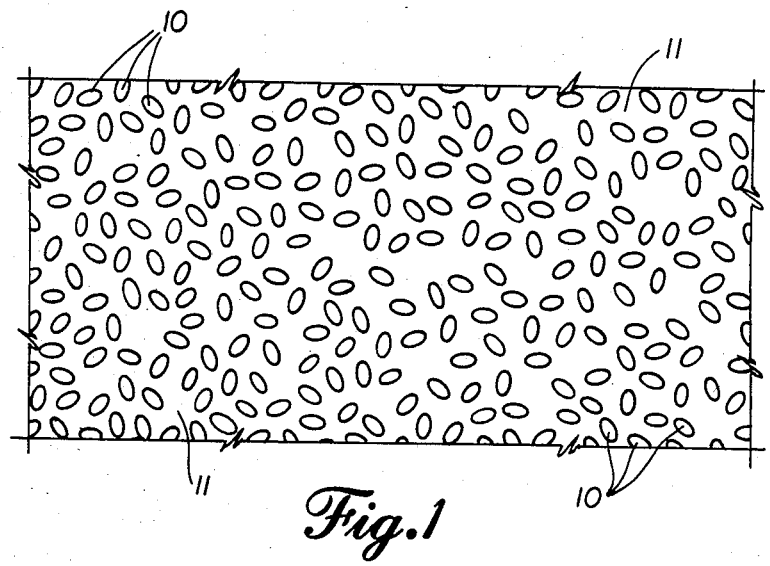
FIG. 1 is a greatly magnified, somewhat diagrammatic plan view of a part of a layer of the paint-like substance of this invention after drying in place.

In FIG. 1 a mass of microencapsulated dye particles 10 are shown as embedded in coating 11 of a substance or paint which dries or sets and holds the microcapsules in place. The paint or coating substance is selected to be durable, to resist dissolving or spreading when wet, as in a rainstorm, and to be sufficiently flexible to resist breaking and sloughing off under pressure such as that of a mounting animal. The materials and the methods for effecting the microencapsulation of various substances are well known in the prior art. For example, the microencapsulated dye particles may be prepared in accordance with the teaching of U.S. Pat. No. 2,800,457 issued to Barrett K. Green and Lowell Schleicher, which relates to a method of making them by coacervation.

By way of example, and not by way of limitation, one paint-like substance effective for the detection of heat in cows was prepared as follows:

A solution was prepared by dissolving 15 grams of gum arabic (Sigma, St. Louis, Mo.) and 15 grams of Type III (Sigma) 225 Bloom stength calf-skin gelatin in 750 grams of water at 75° C. This solution was contained in a one-liter resin-kettle, stirred at 800 to 1300 rpm, and maintained at a temperature of 75° C. The stirring was effected by an axial-flow plastic impeller at the bottom of a vertical shaft driven by an electric motor.

To this solution was added 75 grams of a one-to-one mixture of Automate Yellow 8 dye (Morton Chemical Division of Morton Norwich Products, Inc., Chicago, Ill.) and mineral oil (heavy, Sigma).

Then about 33 milliliters of 10% aqueous solution of acetic acid was added which brought the pH of the mixture to about 3.5. Then the stirring rate was reduced to about 400 rpm, and the stirred mixture was allowed to cool slowly to room temperature. The coacervation of the encapsulated dye particles was effected during this stage of the process.

The mixture was then cooled further to about 10° C. with an ice bath. 75 milliliters of a solution of glutaraldehyde (25% by weight, Aldrich, Milwaukee, Wis.) was then added to the stirred mixture, and the pH of the mixture was then adjusted to about 9 by addition of a 50% solution of sodium hydroxide in water. An additional 75 milliliters of 25% glutaraldehyde was then added. After about 15 minutes the reaction mixture was diluted with water and poured onto a set of sieves. The microcapsules were washed with water on the sieves, and oversized and undersized material was removed. Excess water was allowed to drain from microcapsules of the desired size in range of about 50 to 150 microns in diameter. The resulting wet microcapsule paste amounted to about one quart in volume, and when mixed with the acrylic paint base in approximately a one-to-one ratio produced about two quarts of heat-detector paint. The acrylic paint base which was used was Speedball Titanium White Acrylic Latex Paint (Hunt Manufacturing Co., Statesville, N.C.).

The paint base was selected to have the property of retaining the color of the dye for a sufficiently long period, say, at least twenty-four days, and further, it was flexible or rubbery when dried. A single blow against the flexible dried paint would break few, if any, of the microcapsules, while rubbing under substantial pressure would break most, if not all, of the microcapsules in the pressure area. The size range of the mocrocapsules and the wall thickness were selected to provide such strength characteristics and the material may thus be designed for specific use requirements.

For the purpose of inhibiting the growth of bacteria a suitable antimicrobial preservative is thimerosal, sold under the name "Merthiolate" by the Eastman Company of Rochester, N.Y. - this preservative is a mercury compound Sodium-Ethyl-Mercuri-Thiosalicylate ($C_9H_9HgNaO_2S$). Thimerosal was found to be compatible with the coating substance formulation of this invention and with the animals' skin when used in a concentration of 0.05 percent by weight.

Figure 2:
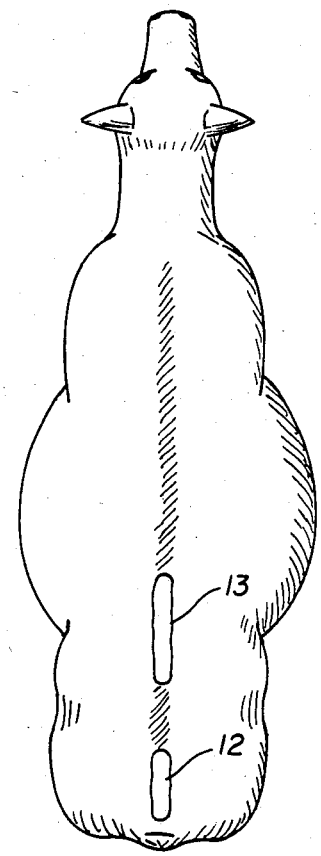
FIG. 2 is a plan view of a patch of the substance on the ramp and another patch along the backbone of a cow.
Figure 3:
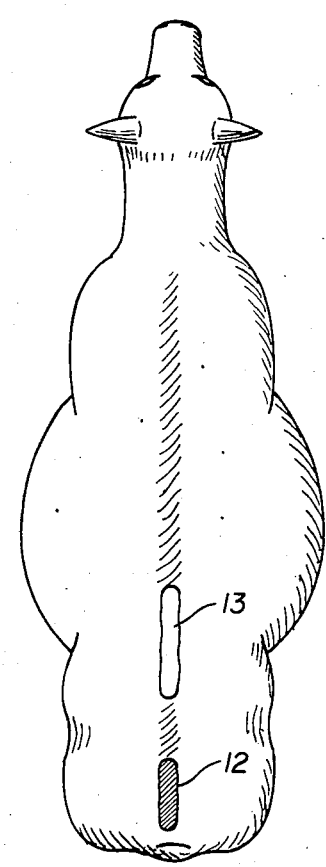
FIG. 3 is a view of the patches of FIG. 2 indicating a change in color after the application of pressure thereto for a significant time.

Referring now to FIG. 2, when the estrus-detecting material is to be used, a layer of the material is applied as a patch to each cow in the herd, the patch being located on the rump near the tailhead, as indicated at 12; a second patch 13 may be applied along the back forward of the rump and spaced several inches from the patch 12. If the cow is mounted and does not reject the mount, heavy pressure and usually some rubbing is applied at the patch 12 and numerous microcapsules are broken and the dye escapes and colors the patch. This provides a positive indication that the cow has been mounted and is in estrus. The patch 13 is out of the pressure area and remains uncolored so that it provides a clear contrast with the vivid color of the patch 12. Thus the use of the two patches provides a proofing system to aid in the quick inspection of the herd. FIG. 3 shows the patch 12 after its change of color, indicated by shading, and also shows the patch 13 as unchanged in color.

The color of the dye is selected to provide a contrast with the color of the base or background paint. A dye of bright or brilliant color is preferable; the colors red, blue and yellow are effective in providing the desired contrast. The yellow dye in the above example is brilliant in color and highly satisfactory for the purposes of this invention. A light color is preferred for the base and white has been found preferable for most applicaions.

The size of the microcapsules and the thickness of the walls are selected to provide the strength required to avoid breaking of the capsules unless they are subjected to a substantial pressure. The paint or coating material is preferably selected to remain flexible after it has dried and a tough rubbery characteristic has been found to be advantageous. The hardness of the capsule walls may be increased by using a cross-linking agent, and in the above example the glutaraldehyde is a cross-linking agent used for this purpose. the use of such cross-linking agents in a process for making minute capsules is described in U.S. Pat. No. 3,190,837 issued to Carl Byrnko and Joseph A. Scarpelli. The selection of the materials and the sizes and strength of the particles makes it possible to design a coasting substance which will effectively perform the function of remaining in place after application and will last for a long period and at least for more than twenty-four days. The ability of the coating substance to resist temperature and moisture changes assures its effectiveness during inclement weather. The use of a brilliant colored dye in the capsules assures quicker detection of color changes of the patches on cows which have been mounted by another animal. This provides a reliable and positive method for detecting which cows in a herd are in estrus.

Paint material prepared in accordance with the above example was tested by application to each of the cows in one herd of fourteen cows. The rump of each cow adjacent the tailhead was painted with a patch of the material and a second patch or strip was painted on several of the cows along the back several inches forward of the first patch and beyond the mounting pressure zone. The cows were observed and checked at itervals of 12 to 24 hours. The covering substance or paint remained in place and unbroken on all cows in the herd and the appearance of color of the patch on the rump provided an accurate identification of those cows which had come into heat and had been mounted during the period between the test observations. When a cow having a second patch had been mounted as indicated by the color of the patch of coating material or paint on the rump the second patch which had not been subjected to the mounting pressure did not change color and the vivid contrasting color difference served as an easy and positive confirmation or proof of the color change of the first patch.

The microcapsules are not of uniform shape or size, and the dimensions indicated as being diameters are, in effect, the average maximum dimensions of the capsules. Each capsule contains one or more oil droplets each droplet ladened with dye.

The terms "paint" and "paint-like" as used herein have reference to a spreadable substance or coating material which has the characteristics identified herein. It is not required that it be a paint as such; for example, it need not be a coating material intended for conventional painting use.

The words "coating material" as used herein mean either the spreadable substance alone or the spreadable substance on an adhesive backing which backing attaches to the animal. The dye may be a liquid, fluidized finely divided solid particles, or other compatible fluid substance which upon release produces a visible indication on the coating material.

While the invention has been described in connection with a specific embodiment, various modifications and other applications will occur to those skilled in the art, and it is intended, by the appended claims, to cover all modifications which fall within the spirit and scope of the invention.

We claim:

1. A coating material for application to an area of the skin of an animal for detecting the application of pressure to such area during mounting by another animal, said material comprising a body of paint and a mass of very small frangible capsules, each containing a liquid dye, whereby, when the material has been applied to the animal's surface and has dried, pressure against said surface for a predetermined period of time of the order of five seconds will break at least a substantial portion of the capsules and impart the color of said dye to the dried material and thereby provide a visual indication that pressure of the order of that present between cattle during mounting has been applied to said surface area of the animal for at least said period of time.

2. A coating material as set forth in claim 1 wherein said point is light in color and flexible and water resistant when dried.

3. A coating material as set forth in claim 1 wherein said dye diffuese in the paint and colors it.

4. A coating material as set forth in claim 1 wherein said capsules are microcapsules.

5. A coating material as set forth in claim wherein said dye is of a bright color contrasting with the color of said base material.

6. A coating material as set forth in claim 1 wherein said dye is of a brilliant yellow color.

7. A coating material as set forth in claim 1 wherein said liquid dye is a mixture of a dye and mineral oil, and the sizes of said capsules lie within a range of from fifty to one-hundred fifty microns.

8. A coating material as set forth in claim 1 wherein said coating material when dried has a rubbery texture.

9. The method of facilitating the detection of estrus in cows which comprises:
providing a coating substance which when dry is responsive to a predetermined pressure applied for a predetermined interval of time for producing a change in its color, said pressure being of the order of that existing between animals during mounting and said interval of time being of the order of five seconds,
coating an area of a cow's hide adjacent the tailhead with said substance to provide a first patch positioned to be responsive to pressure applied by another animal during mounting,
coating a second portion of the cow's hide with the substance to provide a second patch spaced from said first patch and out of the zone of pressure during mounting,
whereby the contrast between the color of the two patches due to said change of color during mounting provides a proofing for positive identification of the cow as having been mounted.

10. The method of making pressure sensitive material useful for the detection of estrus in cows which comprises the steps of:
dissolving substantially equal parts by weight of gum arabic and gelatin to provide about a four percent solution in water while maintaining the temperature at 75° C., and stirring the solution rapidly adding to the solution a one-to-one mixture of a dye and mineral oil to effect encapsulation thereof, adjusting the pH of the solution to about 3.5 and reducing the rate of stirring and cooling the solution slowly to room temperature to effect coacervation of the encapsulated particles, cooling the solution further and adding a cross-linking agent and adjusting the pH to about 9, adding further cross-linking agent and thereafter adding water, separating the particles within a size range of from about fifty to about one-hundred-fifty microns and draining excess water therefrom, and
mixing the separated particles with a paint base to form the estrus detecting product.

11. The method for producing a paint-like material for application to the surface of one object for the detection of the application of pressure for a predetermined time by another object which compreises mixing an oil with a dye and preparing a mass of microcapsules each containing a particle of the mixture, providing a compatible paint-like substance of a color contrasting with that of the dye and having a tough rubbery surface when dried, and thoroughly mixing the mass of encapsulated particles and the paint-like substance to produce the pressure detecting material, the encapsulated dye in said material when it has dried being released and coloring the dried material when it has been under sufficient pressure for the predetermined time.

12. The method for producing a pressure detecting material as set forth in claim 11 wherein said encapsulated particles have sizes within a range of about fifty to about one-hundred-fifty microns.

13. The method for producing a pressure detecting material as set forth in claim 12 wherein said paint-like substance is an acrylic paint base.

The words "coating material" as used herein mean either the spreadable substance alone or the spreadable substance on an adhesive backing which backing attaches to the animal. The dye may be a liquid, fluidized finely divided· solid particles, or other compatible fluid substance which upon release produces a visible indication on the coating material.

14. A coating material for location on an area of the body of an animal for detecting the application of pressure to such area during mounting by another animal, said material comprising a body of liquid having therein a mass of very small frangible capsules, each capsule containing a liquid dye, said material when spread over a surface drying and setting to provide a layer of said capsules on the surface, when said layer has been provided on a surface positioned in said area of the body of an animal, pressure against said surface for a predetermined period of time of the order of five seconds will break at least a substantial portion of the capsules and impart the color of said dye to said surface and thereby provide a visual indication that pressure of the order of that present between cattle during mounting has been applied to said area of the animal for at least said period of time.

15. The method for identifying in a herd of cows any cows that are in estrus which comprises providing a mass of very small frangible capsules, each capsule containing a liquid dye, the strenth of said capsules being such that the application of a predetermined pressure to a layer of said capsules for a predetermined time of the order of five seconds will break at least a substantial portion of the capsules in the layer and thereby indicate that thepressure has been applied for at least about five seconds, applying a layer of the mass of capsules to a mounting contact area of each cow, and periodically observing the cows in the herd and separating the cow or cows on which the color of the dye is observed.

16. The method for producing a coating material for application to the surface of one object for the detection of the application of pressure for a predetermined time by another object which comprises providing a dye and preparing a mass of microcapsules each containing a particle of thedye, providing a compativle spreadable substance of a color contrasting with that of the dye and havig a tough rubbery surface when dried, and thoroughly mixing mass of encapsulated particles and the spreadable substance to produce the pressure detecting material, the encapsulated dye in said material when the material has dried being released and providing a visible indication on the dried material when it has been under sufficient pressure for the predetermined time.

17. A coating material for location on an area of the body of an animal for detecting the application of pressure to such area during mounting by another animal, said material comprising a body of liquid having therein a mass of very small capsules, each capsule containing a fluid dye, said capsules having the characteristic of releasing the dye when sufficient pressure is applied thereto for a predetermined period of time, said material when spread over a surface drying and setting to provide a layer of said capsules on the surface, when said layer has been provided on a surface positioned in said area of the body of an animal, pressure against said surface for a predetermined minimum period of time of the order of five seconds will release fluid from at least a substantial portion of the capsules and impart the color of said dye to said surface and thereby provide a visual indication that pressure of the order of that present between cattle during mounting has been applied to said area of the animal for at least said minimum period of time.

* * * * *